March 14, 1950     M. WARE     2,500,723
GEARING
Filed Sept. 28, 1945     2 Sheets-Sheet 1
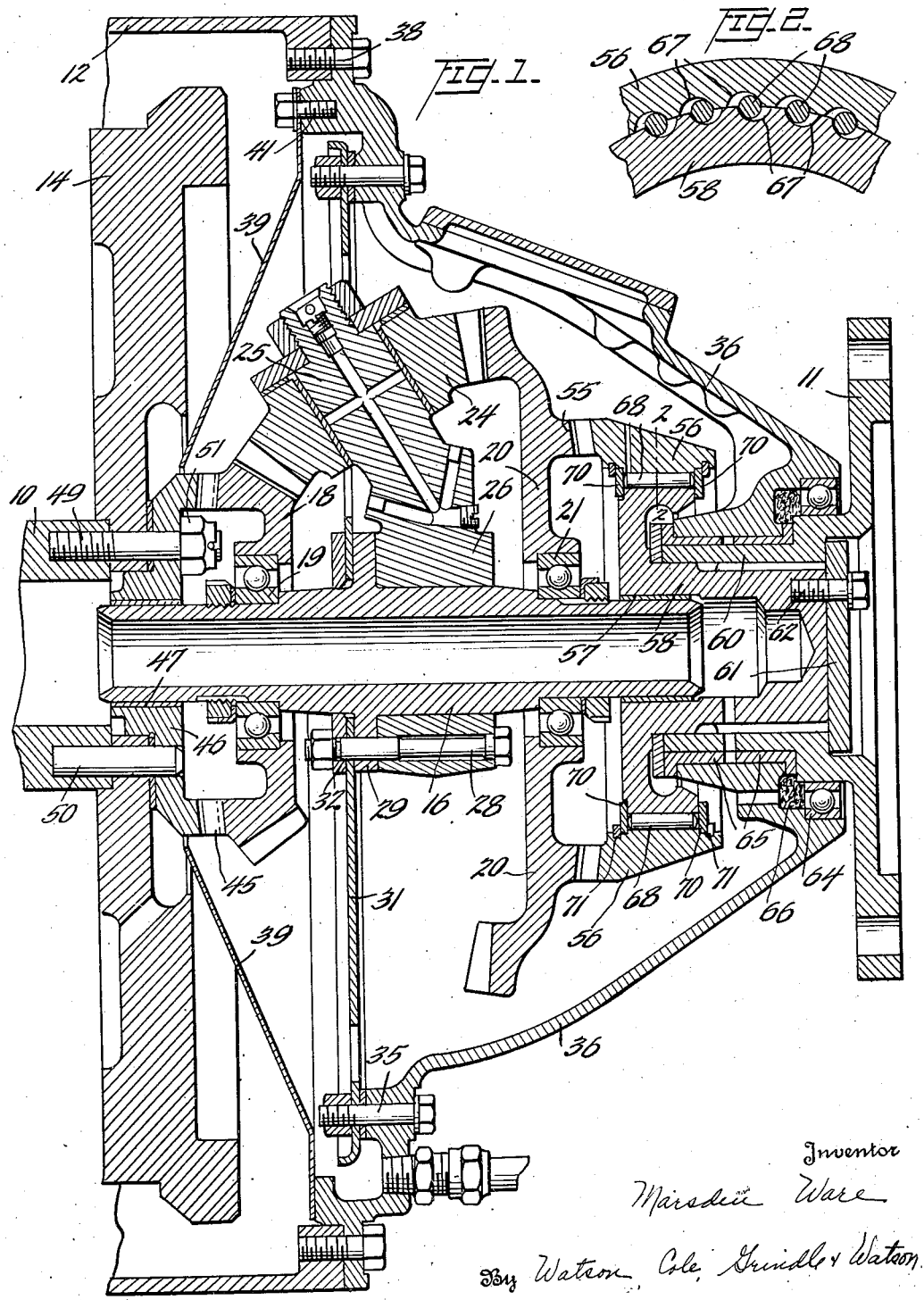
Inventor
Marsden Ware
By Watson, Cole, Grindle & Watson
Attorneys March 14, 1950 M. WARE 2,500,723
GEARING
Filed Sept. 28, 1945 2 Sheets-Sheet 2
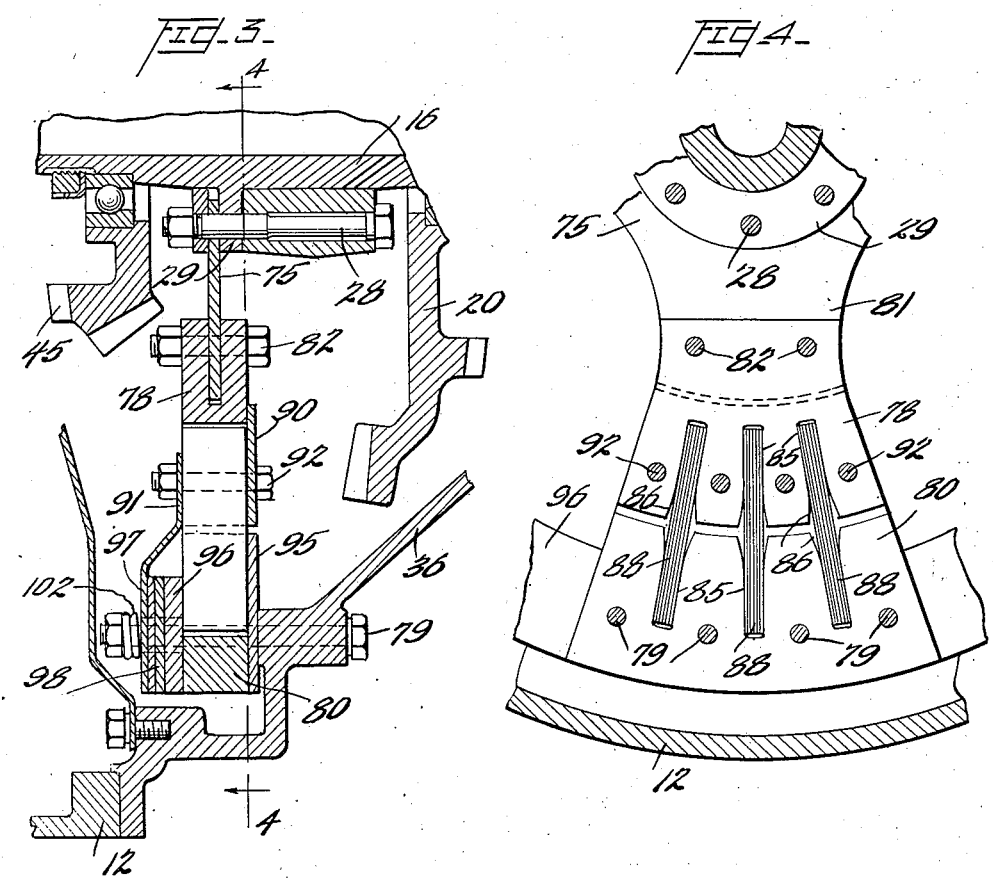
Inventor
Marsden Ware
By Watson, Cole, Grindle & Watson
Attorneys Patented Mar. 14, 1950

2,500,723

UNITED STATES PATENT OFFICE 2,500,723

GEARING

Marsden Ware, Huntington Woods, Mich., assignor to Packard Motor Car Company, Detroit, Mich., a corporation of Michigan Application September 28, 1945, Serial No. 619,056

16 Claims. (Cl. 74—411)

This invention relates to improvements in gearing and has for its principal object the provision of a gear unit which may be readily interposed between rotatable driving and driven shafts.

More specifically, it is an object of the invention to provide a gear unit, including a housing and a gear train within the housing, wherein the gear train is yieldingly supported so as to permit displacement thereof within and with respect to the housing. This arrangement facilitates the employment of the unit for the transmission of power between two coaxial shafts which are fixed in relation to each other, the gear train being displaceable within its housing to accommodate slight dimensional variations and to allow wider tolerances in the manufacture of the housing.

Thus in the preferred embodiment of the instant invention, I employ a simple form of bevel gearing for transmitting torque from a driving shaft to a driven shaft at reduced speed and in a reverse direction. The driving and driven shafts to be connected by the gearing are coaxially disposed, and at least one of these shafts may be mounted in a casing on which the housing for the gearing is to be mounted. The gearing is supported in this housing so as to permit slight axial displacement thereof, whereby the driving and driven shafts may be connected with greater axial tolerances. This arrangement has been found especially suitable in connecting two units which are separately made and independently mounted, for instance, in connecting discarded ship engines to electrical generators.

It is a feature of the invention that the gear train may readily be removed as a unit for servicing, or replaced by another train, the gears being assembled on a common supporting member which is removably mounted in the housing.

A further object of the invention is the provision, in a gear train for connecting two shafts, of a circumferentially yieldable support or fulcrum for said train, whereby shocks applied to said train are absorbed. As a feature of one embodiment of the invention, the yieldable support is provided with means frictionally resisting circumferential displacement of the gear train, whereby torsional disturbances and vibration may be damped.

Further objects and features of the invention will be apparent from the following description taken in connection with the accompanying drawings, in which:

Figure 1 is a longitudinal sectional view through a gearing and housing constructed in accordance with the invention;

Figure 2 is a fragmentary sectional view of a detail, taken substantially on the line 2—2 of Figure 1;

Figure 3 is a longitudinal sectional view corresponding to a portion of Figure 1 but illustrating a modified form of supporting member for the gearing; and Figure 4 is a transverse sectional view taken substantially on the line 4—4 of Figure 3.

In order to facilitate an understanding of the invention, reference is made herein to the preferred embodiment thereof which is shown in the accompanying drawings, and this embodiment is specifically described. It will nevertheless be understood that no limitation of the scope of the invention is thereby intended and that such alterations and changes are contemplated as may be effected by one skilled in the art to which the invention relates.

Referring first to Figure 1 of the drawing, it will be observed that the invention is illustrated as applied to the transmission of power between coaxial driving and driven shafts, the driving shaft being constituted by the engine shaft 10, and the driven shaft, not shown, being operatively connected to the gear unit by means of a conventional coupling member of which the coupling plate 11 constitutes one element. It will be understood that the engine shaft 10 is journaled in the usual manner in suitable bearings in the engine casing 12, and carries at its rearward end a flywheel 14. The details just mentioned are well known and form per se no part of the instant invention, which resides more particularly in the gearing for transmitting torque between the driving and driven shafts as hereinbefore generally mentioned.

In the preferred embodiment of the invention, the gearing comprises a reverse reduction gear train mounted on a common supporting member or shaft 16. Thus a driving bevel gear 18 is journaled on shaft 16 by a ball bearing 19 and a driven bevel gear 20 is similarly journaled by a ball bearing 21, these bearings being constructed to resist axial thrust applied to the respective gears. An idler bevel gear 24 is supported for meshing relation with gears 18 and 20 on an axis intersecting the axis of the shaft 16 at an oblique angle, being journaled for rotation on an inclined spindle 25 formed integrally with and projecting from the hub 26 of a carrier. For convenience in illustration, only one bevel gear 24 and spindle 25 is shown; in practice, a plurality of idler gears, preferably three, are employed, the spindles 25, which support these gears, being equally spaced about the axis of the hub 26 and shaft 16. The hub 26 is secured rigidly to the shaft 16 by means of a plurality of bolts 28 which extend through the hub, through an annular flange 29 formed on the shaft 16, and through a flexible disk 31, the bolts 28 exerting pressure against an annular element 32 to clamp the disk 31 rigidly against the flange 29 of the shaft 16, so that the disk 31 forms in effect part of the supporting member for the gear train. At its periphery the disk 31 is secured at a plurality of spaced points by bolts 35 to a housing 36 which embraces the gear train, and which is in turn secured to the engine casing 12 by peripherally disposed bolts 38. An annular plate 39, bolted to the housing 36 at 41, facilitates the retention of lubricant in the housing and completes the enclosure of the gear train.

It will be observed that the disk 31 is of relatively thin material and is thus subject to flexure, allowing appreciable axial displacement of the shaft 16 and the gear train mounted thereon. In other words, the disk 31 serves as a flexible mount for the gearing, whereby the latter may be displaced axially as a unit with respect to the housing 36, together with the shaft 16 which constitutes the sole means of support for the gear train in the housing. Assembly of the gear train is thus greatly facilitated and other advantages, hereinafter mentioned, are obtained.

The forward face of the driving bevel gear 18 is provided with an axially directed toothed portion 45, adapted to engage with a cooperating toothed portion formed on a member 46, in which the forward end of shaft 16 is journalled by means of a plain bearing 47. The member 46 is secured to the engine shaft 10 by a plurality of circumferentially spaced threaded studs 49 and pins 50, the studs 49 passing through the flywheel 14 and being threaded into the engine shaft 10, these elements being secured rigidly together by nuts 51 threaded on the studs. It will be observed that the shaft 16 may thus be displaced axially, together with driving gear 18 and the remainder of the gear train, to an extent determined by the depth of the coupling teeth 45 without disturbing the operative connection afforded by the coupling, the shaft 16 sliding axially within the plain bearing 47. Such axial displacement of the gear train is yieldingly resisted by the supporting member 31, which flexes axially as hereinbefore explained. It is thus apparent that in mass production involving inaccuracies in machining and the use of rather wide tolerances for the housing and associated parts, such compensation is afforded by the bodily displacement of the gearing as a unit as will insure the establishment of the proper driving relation between the engine shaft 10 and the gears.

The driven bevel gear 20 is similarly provided at its rear face with an axially directed toothed portion 55 which is adapted to engage with a cooperating toothed portion formed on a member 56, the latter being in turn mounted on and connected for rotation with a member 58, in which is journaled the rearward end of shaft 16 by means of a plain bearing 57. Thus, the gear train is permitted a certain amount of axial displacement, limited only by the depth of the coupling teeth 55, the arrangement being essentially similar to that provided at the forward end of the train. The coupling flange 11, which is secured to the ultimate driven shaft or driven element, not shown, is provided with a hub or shaft portion 60, splined to and rotating with the member 58, and retained on the latter against axial displacement by a plate 61 which is bolted at 62 to the member 58. The hub portion 60 of the coupling flange 11 is journalled in the housing 36 by a thrust bearing 64 and a plain bearing 65. An oil seal 66 prevents discharge of oil through the bearing 64. It is thus apparent that by reason of the provision of means permitting axial floating of the gear train within the housing 36, coaxial driving and driven shafts may be properly connected for the transmission of torque therebetween regardless of slight variations in the axial spacing of these shafts, or in the dimensioning and positioning of the engine casing 12 and the housing 36.

The connection between the coupling member 56 and the member 58 is shown more particularly in Fig. 2 of the drawing, these members being formed to provide opposed axially directed pockets 67 which receive pins 68 of a diameter substantially less than the circumferential width of the pockets. This arrangement affords an appreciable amount of play or lost motion in the driving connection, facilitating assembly of the unit between the driving and driven shafts. The members 56, 58 and the pins 68 are retained against relative axial displacement by annular elements 70 which are in turn secured in position by locking elements 71. The lost motion connection just described forms no essential part of the present invention and is not specifically claimed herein.

Turning now to Figures 3 and 4 of the drawings, illustrating a modification of the embodiment hereinbefore described, it will be noted that only a portion of the unit is shown, the structure being identical with that shown in Figure 1 except for the gear train supporting member, which is modified to afford a circumferentially yieldable fulcrum for the gearing for the absorption of shock and the damping of torsional disturbances.

Thus the supporting member or disk 31 of the previously described embodiment is replaced by an annulus 75, secured to the flange 29 of the shaft 16 by bolts 28, and segmental members 78 and 80. There are preferably three pairs of these members, one member 78 of each pair being secured to an arm 81 on the annulus 75 by bolts 82, and one member 80 of each pair being secured to the gear housing 36 by bolts 79. Each of the members 78 and 80 is recessed as shown more particularly in Figure 4 to provide opposed pockets 85, flared at their adjacent ends as shown at 86, the pockets receiving spring assemblies 88. Each spring assembly is constituted by a plurality of alternately disposed spring leaves and shims, it being observed that the arrangement is such that limited relative circumferential movement of the members 78 and 80 may occur, such movement being resisted by the spring assemblies 88. The inner ends of the spring assemblies are retained in position in the pockets 85 in the members 78 by segmental plates 90 and 91, which are clamped against the opposite faces of the member 78 by bolts 92. The retention of the spring assemblies in the pockets 85 in the members 80 is effected by segmental plates 95, engaging one face of each member 80, and by an annular plate 96 which engages the opposite face of all three of the members 80. Each of the plates 91 is formed of spring steel or like resilient material, and is extended radially outward as indicated at 97 to overlie the annular plate 96. An annulus 98 of friction material, for instance, brake lining, is disposed against the forward face of the annular plate 96, and is interposed between the latter and each of the resilient extensions 97 of the plates 91. The bolts 79 pass with a snug fit through apertures in bosses formed on the housing 36, through the several elements 80, and the annular plate 96, and through enlarged apertures in the friction annulus 98 and the resilient extensions 97, whereby the members 80 and the annulus 96 are retained against circumferential displacement with respect to the housing, and the friction annulus 98 is permitted to float between the resilient extensions 97 and the annulus 96. Pressure is applied by coil springs 102 surrounding the bolts 79 to increase the frictional resistance developed at the friction annulus 98 to relative movement between the members 80 and 78, and additional pressure may be similarly applied at a multiplicity of circumferentially displaced points, if necessary, to increase the degree and uniformity of frictional resistance so developed.

It will be appreciated from the foregoing that when shocks are transmitted through the gearing, the idler gear 24 tends to roll on the driven gear 20, thereby causing slight circumferential displacement of the spindle 25 on which the idler is supported. By the use of the modified form of support shown in Figures 3 and 4, such circumferential displacement is permitted but is yieldingly resisted, so that the energy imposed by the shock is absorbed in the spring assemblies 88 and subsequently restored to the system. Torsional disturbances or vibrations transmitted from the engine shaft to the gearing are similarly absorbed, and the energy of such vibrations is damped by the friction developed at the friction annulus 98, being dissipated in the form of heat. Furthermore, the supporting means illustrated in Figures 3 and 4 may be made sufficiently flexible at the central portion 75 thereof to permit the axial displacement of the gear train which is inherent in the construction shown in Figures 1 and 2, for the purpose of facilitating assembly of the unit and compensating for inaccuracies in machining.

It will be appreciated that a gearing constructed as described herein, in which the gears are mounted on a supporting member so as to constitute with the supporting member a separate unit, greatly facilitates replacement for repairs. Again, since the supporting member is not axially confined by its bearings, and is connected to the driving and driven members through axially displaceable couplings, proper functioning is assured even though the tolerances are fairly wide.

Having thus described the invention, what is claimed as new and desired to be secured by Letters Patent is:

1. Reversing gearing for transmitting rotation between coaxial driving and driven shafts, said gearing comprising coaxial driving and driven bevel gears, axially displaceable coupling means associated with said driving and driven gears to connect said gears respectively to said driving and driven shafts for rotation therewith, a common supporting member on which said gears are journaled for rotation, an idler bevel gear meshing with said driving and driven gears, means mounting said idler gear on said supporting member for rotation on an axis intersecting the axis of said gears, a housing for said gears, and yielding means mounting said supporting member in said housing for displacement with respect to said housing in the direction of the axis of the shafts to be connected, said yielding means retaining said supporting member and idler gear against rotation about the axis of the shafts.

2. Reversing gearing as claimed in claim 1 in which said yielding means comprises a flexible disk secured at its central portion to said supporting member and at its periphery with said housing.

3. In a gearing unit for transmitting rotation between coaxial driving and driven shafts, the combination with a gear train including coaxial driving and driven gears, of a shaft on which said driving and driven gears are mounted, coupling means for connecting said driving and driven gears to said driving and driven shafts respectively, each coupling means comprising a pair of coupling elements which are axially displaceable with respect to each other, means retaining said gear train and one coupling element of each pair against axial displacement on said shaft, a housing for said gearing, and yielding means mounting said shaft in said housing for axial displacement with respect thereto.

4. A gearing unit for operatively connecting a pair of coaxial rotating shafts, said unit comprising, in combination, a gear housing, a gear support, yielding means mounting said support in said housing for displacement with respect to said housing in the direction of the axis of the shafts to be connected, a gear train mounted on said support and including coaxial driving and driven gears, and axially displaceable couplings for connecting said driving and driven gears for direct rotation with their respective shafts, whereby said gear train may float axially in said housing while operatively connected with said shafts.

5. In a gearing unit for operatively connecting a pair of coaxial rotating shafts, the combination with a housing, of gear supporting means in said housing, yielding means mounting said supporting means for displacement with respect to the housing in the direction of the axis of the shafts to be connected, a gear train mounted on said supporting means, and a pair of axially displaceable couplings operatively connected by said gear train and constituting the driving and driven elements respectively of said unit, said couplings being mounted on said supporting means and serving to connect said shafts to said gear train, whereby said gear train may float in said housing axially of the shafts while operatively connecting the latter.

6. Reversing gearing for transmitting rotation between coaxial driving and driven shafts, said gearing comprising coaxial driving and driven bevel gears, coupling means associated with said driving and driven gears to connect said gears respectively to said driving and driven shafts for rotation therewith, a common supporting member on which said gears are journaled for rotation, an idler bevel gear meshing with said driving and driven gears, means mounting said idler gear on said supporting member for rotation on an axis intersecting the axis of said gears, said mounting means and supporting member being mounted for rotation as a unit about the axis of said shafts, and means yieldably retaining said supporting member against rotation, whereby shocks applied to said gearing are absorbed by rotation of said idler gear about the axis of said shafts.

7. A gearing unit operable by a driving shaft, said unit comprising in combination, a gear housing, a gear support, yielding means mounting said support in said housing for limited circumferential displacement with respect to said housing about the axis of the shaft, and a gear train mounted on said support and including coaxial driving and driven gears and an idler gear, a mount for said idler gear comprising a member rotatable with said support on the axis of the shaft, whereby shocks applied to said train are absorbed by rotation of said idler gear about the axis of said shaft.

8. In a gearing unit for connection to an engine shaft, the combination with a housing, of gear supporting means in said housing, yielding means mounting said supporting means for displacement with respect to the housing in the direction of the axis of the engine shaft, a gear train mounted on said supporting means, an axially displaceable coupling for connecting said gear train to said engine shaft, said coupling being mounted on said supporting means, and means to connect said housing to the engine casing, whereby said gear train may float in said housing axially of the engine shaft while operatively connected to the latter.

9. Reversing gearing comprising coaxial driving and driven bevel gears, a common supporting member on which said gears are journaled for rotation, an idler bevel gear meshing with said driving and driven gears, means mounting said idler gear on said supporting member for rotation on an axis intersecting the axis of said gears, and means resiliently and frictionally resisting rotation of said supporting member, whereby torsional vibrations transmitted to said gearing are damped.

10. A gearing unit for operatively connecting a pair of coaxial rotating shafts, said unit comprising, in combination, a gear housing, a gear support, yielding means mounting said support in said housing for limited circumferential displacement with respect to said housing about the axis of the shafts to be connected, a gear train mounted on said support and including coaxial driving and driven gears and an idler gear, and means frictionally resisting circumferential displacement of said support, whereby torsional vibrations and disturbances are damped.

11. In a gearing unit for transmitting rotation between coaxial driving and driven shafts, the combination with a gear train including coaxial driving and driven gears and an idler bevel gear therebetween, of a supporting shaft on which said driving and driven gears are journalled, means mounting said idler gear on said supporting shaft for rotation on an axis intersecting the axis of said gears, a housing for said gear train, and yielding means mounting said supporting shaft in said housing for unitary displacement of said shaft and of the entire gear train with respect to said housing in the direction of the axis of the driving and driven gears, said yielding means retaining said supporting shaft and idler gear against rotation about the shaft axis.

12. In a gearing unit for transmitting rotation between coaxial driving and driven shafts, the combination with a housing for said gearing unit, of means including a pair of coaxially spaced bearings carried by said housing and said driving shaft respectively, a gear supporting member mounted in said bearings for axial movement therein, a bevel gear train mounted on said supporting member, and yielding means mounting said supporting member in said housing for unitary displacement of said member and of the entire gear train with respect to said housing and said bearings in the direction of the axis of the supporting member, said yielding means retaining said supporting member against rotation relative to the housing.

13. In a gearing unit for transmitting rotation between coaxial driving and driven shafts supported for rotation in bearing means, the combination with driving and driven elements adapted to be secured to said driving and driven shafts respectively, a supporting member journalled in said elements for axial displacement with respect thereto, a gear train mounted on and axially displaceable with said supporting member, yielding means for connecting said supporting means with said bearing means and resisting rotation of said supporting member while permitting axial displacement thereof, and axially displaceable couplings drivingly connecting said gear train with said elements.

14. In a gearing unit for transmitting rotation between coaxial driving and driven shafts, said shafts being mounted in a housing, the combination with driving and driven elements mounted in said housing for connection respectively to said driving and driven shafts, a member supported in said elements for axial displacement with respect thereto, yielding means connected between said housing and said member to resist rotation of the latter while permitting axial displacement thereof, a gear train comprising driving and driven gears and an idler gear mounted on said member and displaceable therewith, and axially separable coupling means connecting said driving and driven gears with said driving and driven elements respectively.

15. In a gearing unit for connection to an engine casing having an engine shaft therein, the combination with a housing, of means mounting said housing on said engine casing, gear supporting means in said housing, means connecting said housing and said gear supporting means to resist rotation of the latter while permitting axial displacement thereof with respect to the housing, a gear train mounted on said supporting means and including coaxial driving and driven gears and an idler gear, means connecting said idler gear to said supporting means to resist rotation of said idler gear about the axis of said driving and driven gears and means including an axially displaceable coupling element for connecting said gear train to said engine shaft, said coupling element being mounted on said supporting means, whereby said gear train may float in said housing axially of the engine shaft while operatively connected to the latter.

16. In a gearing unit, the combination with a gear train including coaxial driving and driven bevel gears, a supporting shaft, means journalling said gears on said shaft, an idler bevel gear meshing with said driving and driven gears, means on said shaft mounting said idler gear for rotation on an axis intersecting the shaft axis, a gear housing, a connection between said housing and said idler gear mounting means to resist rotation of the latter, an axial coupling element carried by each of said driving and driven gears, cooperating axial coupling elements meshing respectively with the coupling elements carried by said driving and driven gears, and means journalling said supporting shaft in said last named cooperating axial coupling elements.

MARSDEN WARE.

REFERENCES CITED

The following references are of record in the file of this patent:

UNITED STATES PATENTS

| Number | Name | Date |
| --- | --- | --- |
| 1,701,246 | Ryder | Feb. 5, 1929 |
| 1,763,023 | Tyler | June 10, 1930 |
| 1,946,956 | Waseige | Feb. 13, 1934 |
| 1,961,619 | McClain | June 5, 1934 |
| 2,067,023 | Schleicher | Jan. 5, 1937 |
| 2,247,839 | Halford | July 1, 1941 |

FOREIGN PATENTS

| Number | Country | Date |
| --- | --- | --- |
| 30,791 | Norway | June 7, 1920 |
| 330,233 | Italy | Oct. 8, 1935 |
| 353,339 | Italy | Oct. 12, 1937 |